United States Patent Office 3,396,386
Patented Aug. 6, 1968

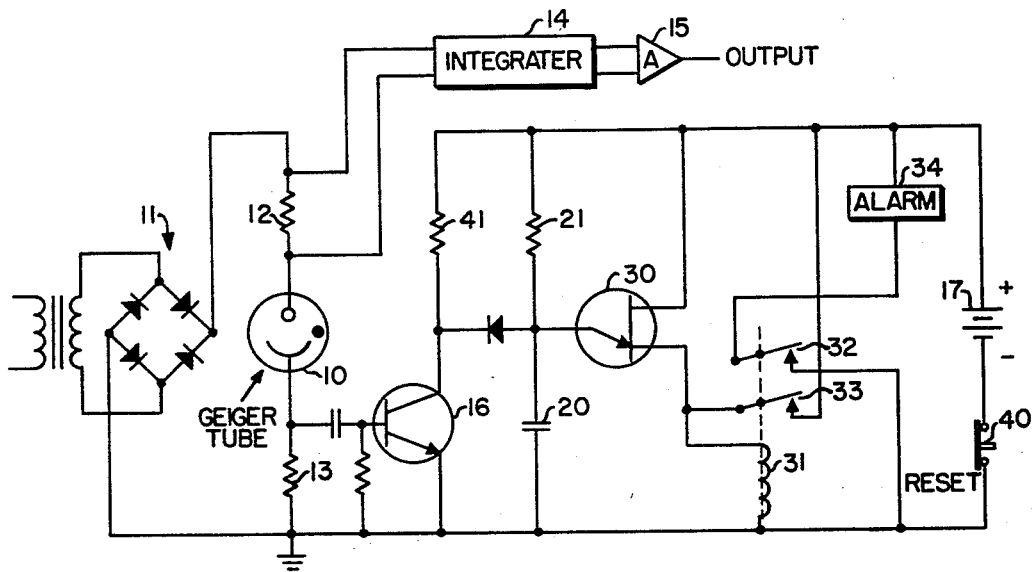

3,396,386
RADIATION DETECTING APPARATUS
WITH SELF-CHECK
James H. Garfunkel, Minnetonka Village, and Gary W. Spence, St. Louis Park, Minn., assignors to Honeywell Inc., Minneapolis, Minn., a corporation of Delaware
Filed Nov. 8, 1965, Ser. No. 506,820
6 Claims. (Cl. 340—409)

ABSTRACT OF THE DISCLOSURE

A Geiger tube connected to control a first and a second output, the first output responding to frequent counting of the Geiger tube to indicate the presence of radiation, and the second output responding to the absence of background counting of the Geiger tube to indicate that the Geiger tube has failed.

---

Our invention is concerned with an improved condition detecting apparatus of the type employing a condition sensor having an inherent background count wherein our invention provides means to be controlled upon a fault condition which results in the absence of such a background count.

Our invention may be utilized with a Geiger tube condition sensor. Such a condition sensor is generally characterized as a sensor having an anode and a cathode disposed in an ionizable gas, and which, upon being subjected to radiation to which it is sensitive, causes an electron to be present within the electrical field established by the anode and cathode, whereupon the electron accelerates toward the anode, ionizing the gas, and causing an arc discharge current to flow, which current may be subsequently quenched by means of a quenching mechanism. A condition sensor of this general type operates in one of two modes. The first mode exists when the condition sensor is subject to the condition to be detected. In this mode, the sensor passes discrete pulses of electrical current at a frequent interval, as an indication of the presence of the condition. The second mode of operation exists when the sensor is not subjected to the condition. In this mode the sensor passes discrete pulses of electrical current which are of a random and an infrequent interval.

In the single figure, we disclose a preferred embodiment of our invention wherein the Geiger tube sensor is identified by reference numeral 10 and receives its operating voltage from a pulsating DC source 11. Connected in series circuit with Geiger tube 10 are a pair of load resistors 12 and 13. Load resistor 12 may, for example, be a 5000 ohm resistor. The pulses of current flowing through this resistor 12 provide a first output which is fed to an integrating network 14 and then to an amplifier 15 to provide an output indicative of the presence of the condition to be detected, for example, fire in an area to be supervised by Geiger tube 10. When fire is present, the Geiger tube counts at a frequent interval. This frequent signal is integrated to provide a control signal to amplifier 15. Amplifier 15 may, for example, be used to sound a fire alarm. In the presence of only the background count, of the infrequent interval, a signal does not pass through the integrator.

The second load resistor 13 may, for example, be a 500 ohm resistor. This resistor is connected in controlling relation to a transistor 16 which receives its operating voltage from its source of DC voltage 17, through resistor 41. Source 17 may be in the 12 to 18 volt range, and resistor 41 may have a value of 10,000 ohms.

Transistor 16 is connected so as to be normally nonconductive and to be rendered conductive as current pulses occur across resistor 13. Thus, when Geiger tube 10 is subjected to a fire, the first output, including amplifier 15, is effective to indicate the presence of fire and transistor 16 is rendered conductive at a frequent interval. In the absence of fire, only a background count exists and transistor 16 is rendered conductive at an infrequent interval.

Conduction of transistor 16 controls the state of charge of a capacitor 20 which is connected to DC source 17 through a resistor 21. Capacitor 20 may be a 100 microfarad capacitor and resistor 21 may be a 500,000 ohm resistor. So long as transistor 16 is nonconductive, capacitor 20 charges such that its upper plate becomes increasingly positive. However, conduction of transistor 16 is effective to discharge the capacitor and thus, so long as transistor 16 is rendered conductive periodically, capacitor 20 remains substantially discharged.

In an embodiment of our invention, a construction has been provided whereby capacitor 20 assumes a given charge if transistor 16 is not rendered conductive in a two minute interval.

The state of charge of capacitor 20 is effective to control the conduction of a unijunction transistor 30, unijunction transistor 30 being normally nonconductive. In the above mentioned embodiment, unijunction 30 was rendered conductive when capacitor 20 assumed said given charge. The state of conduction of unijunction transistor 30 controls the energization of a relay 31 having normally open switches 32 and 33. Switch 33 is a latching switch and switch 32 is effective to energize an alarm 34.

The operation of our invention can be considered by assuming Geiger tube 10 to be located in an area to be supervised for the presence of a fire. The Geiger tube experiences prolonged periods of inactivity, in fact, the Geiger tube may never be required to indicate the presence of a fire since, in most cases, a fire does not occur. However, our invention provides a means of monitoring the ability of Geiger tube 10 to detect a fire, should one occur. During these prolonged periods of inactivity in which a fire does not occur, Geiger tube 10 does continuously experience the inherent background count, this being an inherent characteristic of this type of the sensor. So long as this background count continues to exist, transistor 16 is rendered conductive at an infrequent interval, however, the conduction is at an interval which is frequent enough to maintain capacitor 20 discharged, or at least charged to a level which is below the level necessary to render unijunction transistor 30 conductive. Should Geiger tube 10 become a "dead" tube which is incapable to detecting a fire should one occur, then unijunction transistor 30 is rendered conductive and relay 31 is energized. Energization of this relay latches the relay to source 17 and also energizes alarm 34 to call attention to the fact that Geiger 10 can no longer be relied upon. The Geiger tube can then be replaced and a manual reset switch 40 is depressed to replace the structure to the condition wherein relay 31 is deenergized.

We claim as our invention:
1. In an electromagnetic radiation detecting apparatus of the type having radiation sensing means with a pair of electrodes disposed in an ionizable gaseous medium, the electrodes being connected to a source of operating voltage, said sensing means being characterized as having two modes of operation, the first mode existing when said sensing means is subjected to electromagnetic radiation to be detected and passes discrete pulses of electrical current at a frequent interval as an indication of the presence of such radiation, and the second mode existing when said sensing means is not subjected to the condition and passes discrete pulses of electrical current at an infrequent interval, the improvement comprising;

first output means connected in circuit with said sensing means and responsive only to said discrete pulses of electrical current of a frequent interval to provide an indication of the presence of the radiation to be detected; and second output means connected in circuit with said sensing means and responsive to the absence of discrete pulses of electrical current to provide an output indicative of a faulty sensing means.

2. In an electromagnetic radiation detecting apparatus of the type having a radiation sensing means which continuously provides output pulses, the output pulses being of an infrequent interval in the absence of radiation to which it is sensitive and being of a frequent interval in the presence of such radiation, the apparatus having means controlled by the sensing means to provide an output indicative of the presence of such radiation only upon the presence of the frequent interval pulses, the improvement comprising;

failure responsive means controlled by the sensing means to provide a second output indicative of a failure of the apparatus upon the absence of the output pulses.

3. Apparatus as defined in claim 2 wherein said failure responsive means includes capacitor means whose state of charge is indicative of the frequency of the output pulses.

4. Apparatus as defined in claim 3 wherein said second output includes a voltage sensitive switch connected to be responsive to the state of charge of said capacitor means.

5. Apparatus as defined in claim 2 wherein said failure responsive means includes a capacitor which is connected to a voltage source to receive a given charge over a given time period, wherein the presence of the output pulses of at least the infrequent interval is effective to periodically discharge said capacitor to maintain the charge thereon below said given charge, and wherein said second output includes a voltage sensitive switch connected to said capacitor to be responsive to a charge thereon which is at least equal to said given charge.

6. Apparatus as defined in claim 2 wherein said failure responsive means comprises;

a capacitor and a resistor connected to a source of DC voltage to normally charge said capacitor to a given voltage in a time period which is long in relation to said infrequent interval, a first transistor having its input connected to be controlled by the sensing means and having its output connected to discharge said capacitor upon the occurrence of an output pulse, and a second transistor having its input connected to said capacitor and its output connected through output means to a source of voltage such that said output means is energized only upon said capacitor being charged to said given voltage.

References Cited

UNITED STATES PATENTS

| 2,550,488 | 4/1951 | Marsh | 340—213 |
|---|---|---|---|
| 2,812,513 | 11/1957 | Breggin | 340—213 X |
| 3,159,747 | 12/1964 | Jones. | |
| 2,536,527 | 1/1951 | Appel. | |
| 2,811,711 | 10/1957 | Cade et al. | 340—228.2 |
| 2,919,438 | 12/1959 | Deziel | 340—228 |
| 3,201,776 | 8/1965 | Morrow et al. | 340—261 |

JOHN W. CALDWELL, *Primary Examiner.*

D. L. TRAFTON, *Assistant Examiner.*